Aug. 26, 1952 — L. W. STAHL — 2,608,385
LUBRICATION FOR ROTARY HYDRAULIC SWIVELS
Filed June 23, 1947 — 2 SHEETS—SHEET 2
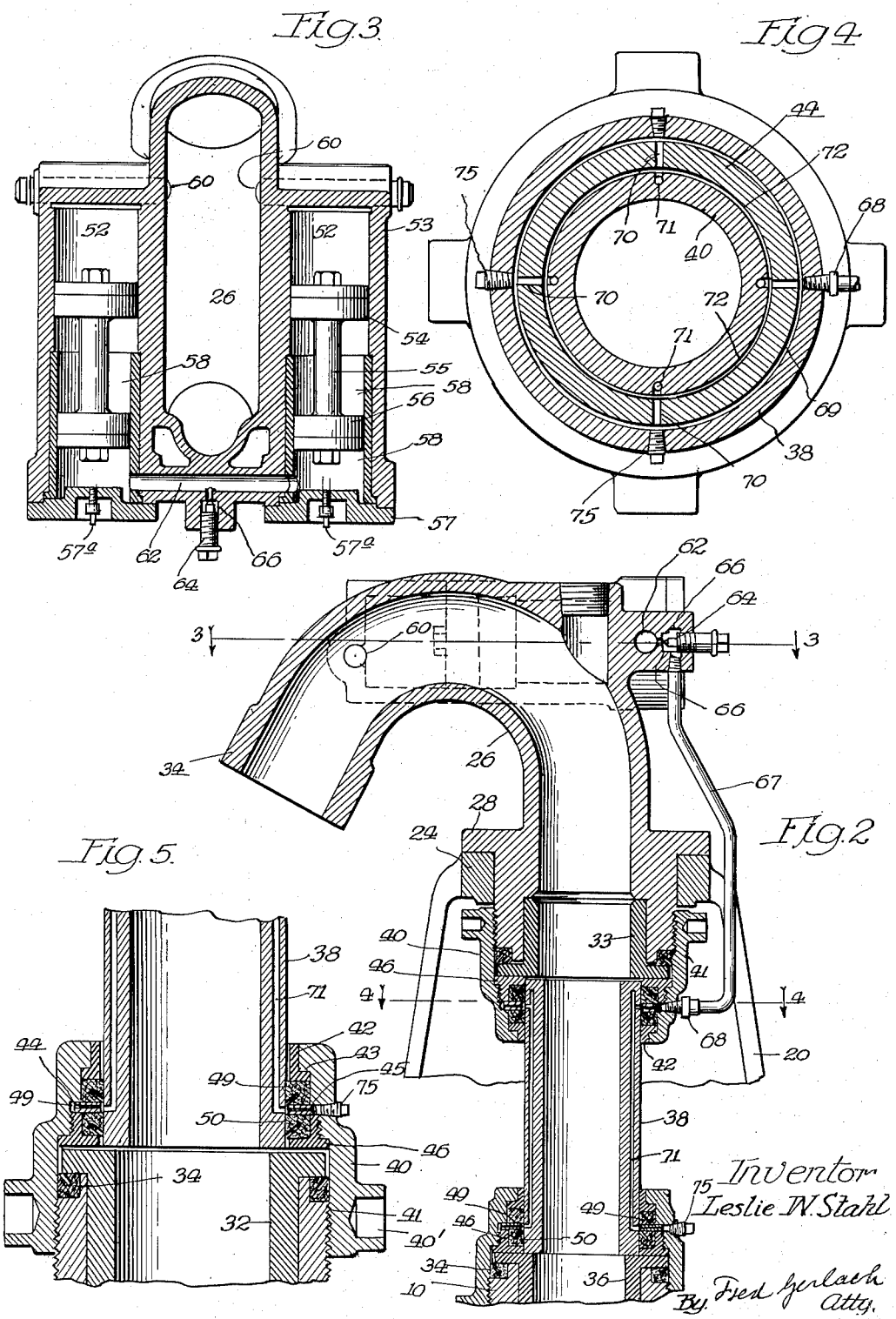
Inventor
Leslie W. Stahl
By Fred Gerlach
Atty.

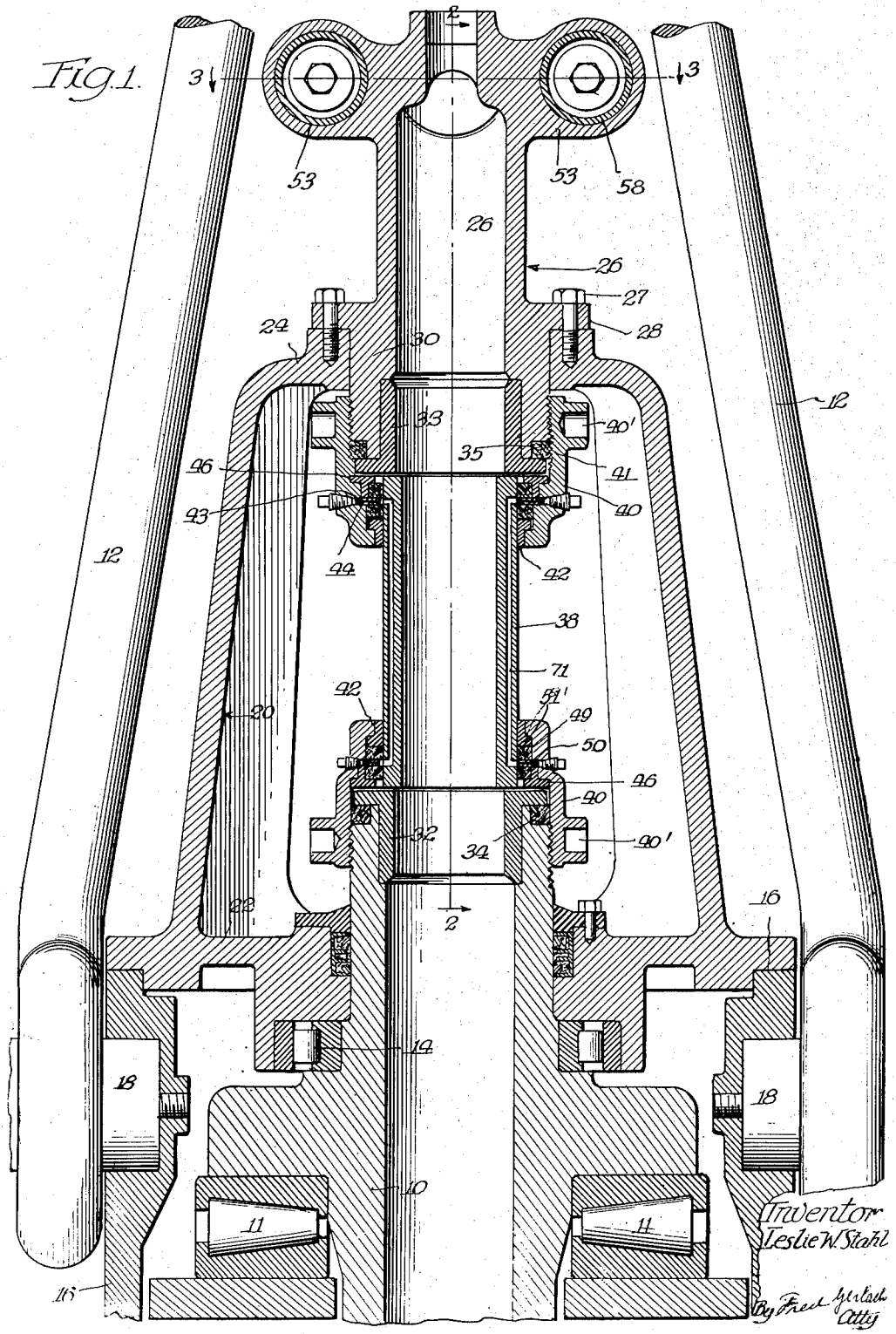

Patented Aug. 26, 1952

2,608,385

UNITED STATES PATENT OFFICE 2,608,385

LUBRICATION FOR ROTARY HYDRAULIC SWIVELS

Leslie W. Stahl, Houston, Tex., assignor to The Locomotive Finished Material Company, Atchison, Kans., a corporation of Kansas Application June 23, 1947, Serial No. 756,377

1 Claim. (Cl. 255—25)

The invention relates to rotary hydraulic swivels, more particularly of the type employed in well or other drilling operations.

One object of the invention is to provide improved lubricating means for the sealing means of packing devices between stationary and rotatable elements of the swivel, whereby lubricant under pressure will be continuously forced to the sealing means.

Another object of the invention is to provide lubricating means for the sealing means between the rotary and stationary elements, which includes a reservoir associated with a non-rotatable element from which lubricant will be fed to the sealing means.

Another object of the invention is to provide lubricating means for the sealing connections between the stationary and rotatable elements by which a constant metered flow of lubricant will be delivered to the parts requiring lubrication.

Another object of the invention is to provide a lubricating system or means for the packing devices between the stationary and rotating elements of the swivel in which pressure for forcing the lubricant to said devices will be supplied by the pressure of the wash fluid which is delivered through the swivel to the drill pipe.

Another object of the invention is to provide a lubricating system or means which includes a reservoir for lubricant, which is integral with the gooseneck of the swivel and from which lubricant is fed to the packing devices.

A still further object of the invention is to provide a lubricating system for hydraulic swivels in which the pressure for delivering lubricant from a reservoir to the packing devices by pressure produced by the hydraulic fluid passing through the gooseneck, and by which the lubricant is subjected to a greater pressure than the pressure of said fluid.

Other objects of the invention will appear from the detailed description.

The invention consists in the several novel features hereinafter set forth, and more particularly defined by claims at the conclusion hereof.

In the drawings:

Fig. 1 is a central vertical section of a hydraulic swivel embodying the invention.

Fig. 2 is a section taken on line 2—2 of Fig. 1.

Fig. 3 is a section taken on line 3—3 of Fig. 2.

Fig. 4 is a section taken on line 4—4 of Fig. 2.

Fig. 5 is a central vertical section on an enlarged scale, of one of the packing devices.

The invention is exemplified in a hydraulic swivel which comprises a rotatable tubular stem 10 which is usually driven by a rotary table and connected to the upper end of a pipe which conducts wash fluid to a drilling tool at its lower end, as well understood in the art. The upper end of stem 10 extends through a casing 16 which is supported by a bail 12 which is connected to trunnions 18 which are mounted in said casing. Bail 12 is usually supported by a cable hoist for raising and lowering the swivel. Rotatable stem 10 is journalled in a main thrust bearing 11 and a radial bearing 14 of the anti-friction type, for rotation in casing 16. A bonnet 20 includes a head 22 which forms a closure for the top of casing 16. The bonnet 20 includes an annulus 24 at its upper end. A gooseneck 26 has an annular flange 28 which is secured by bolts 27, to the top of bonnet 20 and is supported from casing 16 by said bonnet. Fluid for delivery to the drill pipe, is conducted to the offset portion of the gooseneck by the usual flexible pipe (not shown) for delivering wash fluid through the gooseneck to stem 10 and the drill pipe. The gooseneck exemplifies a non-rotatable element of the swivel, and the stem 10 a rotatable element thereof. A replaceable bushing 32 is secured in the upper end of stem 10 and a similar bushing 33 is secured in the lower end of gooseneck 26.

The lower end of goose neck 26 which extends through annulus 24 of bonnet 20, and the upper end of the rotatable stem, are spaced apart vertically and are communicatively connected for the flow of wash fluid from the gooseneck into the bore of stem 10 by a demountable tube or pipe section 38. Demountable unitary packing assemblies or devices which include sealing rings, are provided between the upper and lower ends of tube 38 and gooseneck 26 and stem 10, respectively, for preventing escape of fluid. Tube 38 is floatingly held between gooseneck 26 and stem 10 and is free to rotate with the rotatable packing device on the lower end of tube 38 which is connected to stem 10, or to permit the tube to remain stationary with the packing device on the non-rotatable gooseneck 26. This tube 38 exemplifies a fluid conducting element which is rotatable relatively to the gooseneck 26, or relatively to stem 10. In this construction, the wear is distributed between the contacting surfaces of the sealing rings which are of flexible and absorbent material, and said tube. This construction also supports the tube so it is free to position itself to compensate for any axial misalignment of the elements and the tube while maintaining the fluid seals. The two demountable packing devices containing the sealing rings, may be unitarily removed laterally, independently of the gooseneck and stem 10. The packing devices are provided with means for introducing lubricant between the contact surfaces of the tube and the sealing rings, for lubricating said contacting surfaces. These packing devices are alike in construction, so that they may be interchangeably and demountably attached to the non-rotatable gooseneck 26 and the stem 10. These packing devices, when detached from the gooseneck 26 and stem 10, respectively, are slidable together on the tube 38, so that the tube and packing devices may be unitarily removed laterally from between the gooseneck and stem. For this purpose, the overall height of the packing devices when moved together on tube 38, is less than the space between gooseneck 26 and stem 10.

Each packing device consists of an unitary assembly which comprises a collar 40 which is provided with a screw thread 41 whereby it may be demountably attached to the lower end of gooseneck 26 or to the stem 10, which are provided with corresponding screw threads. Each collar 40 is provided with sockets 40¹ which are adapted to receive a bar for rotating the collar onto or off the fluid conducting elements. A replaceable bushing 42 which is angular in cross-section, is seated against an annular shoulder 43 in the posterior end of each collar. An oil distributing ring 44 is seated against an internal annular shoulder 45 in collar 40, and is secured against said shoulder by a gland 46 which is screw-threaded into collar 40. A sealing ring of flexible and absorbent packing material 49, is confined between ring 44 and bushing 42, and a similar sealing ring 50 is confined between ring 44 and gland 46. Bushings 42 and 46 are bored to leave clearance around tube 38, so that the sealing rings 49 and 50 will form the contacting surfaces between tube 38 and the packing devices. As a result, tube 38 will contact adjacent its ends, mainly with the inner periphery of sealing rings 49 and 50 so that the tube may remain stationary with the gooseneck 26 or rotate with stem 10, and so that the wear will be distributed to the contact surfaces between tube 38 and the sealing rings in both packing devices, and the tube will be free to position itself in the sealing rings and compensate for axial misalignment of gooseneck 26 and stem 10 while maintaining the fluid seals. A ring 34 of packing between bushing 32 and stem 10, forms a seal between stem 10 and the collar 40 of the lower packing device. A ring 35 of packing between bushing 33 and gooseneck 26, forms a seal between said gooseneck and the collar 40 of the upper packing device.

In the operation of these hydraulic swivels which include a floating tube, it is advantageous to keep the sealing rings well lubricated for preventing wear. Radial ports 70 extend through each oil ring 44 and conduct lubricant from an annular space 69 in collar 40, to a channel 72 around tube 38. Axial ports 71 in tube 38 have their ends communicatively connected to channels 72 in the upper and lower packing devices. From each channel 72 lubricant flows to the associated sealing rings 49 and 50. Each ring 49 and 50 is provided with an annular groove 51 for spreading lubricant in the absorbent rings.

The invention provides for continuously supplying lubricant under pressure to the contacting surfaces between tube 38 and the sealing rings 49 and 50, from a supply of lubricant associated with the gooseneck 26 and also to provide the pressure for this purpose, by the wash fluid flowing through the gooseneck. Gooseneck 26 is integrally extended to provide a cylinder-casing 53 at both sides of the gooseneck. Cylinders 52 are formed in casing 53 which are communicatively connected to the bore of the gooseneck by ducts 60 which extend crosswise of said cylinders, at one end thereof, for delivering wash fluid into said cylinders. Casing 53 is provided with cylinders 58 of lesser diameter than and axially aligned with, cylinders 52, respectively. Double pistons are slidably mounted in the coaxial cylinders 52, 58. Each piston comprises a member 54 fitting in one of the cylinders 52, a member 56 fitting in the axially aligned cylinder 58, and a connecting stem 55 between said members. Cylinders 58 are communicatively connected by a cross-duct 62 and function as a reservoir for a supply of lubricant. Piston-members 54 are exposed to the pressure of the wash-fluid passing from the gooseneck via ducts 60, into cylinders 52, and piston-members 56 are slidable in cylinders 58 to force lubricant therefrom. The diameter of piston members 54 is greater than the diameter of piston-members 56, to provide a greater piston area exposed to the pressure of the wash-fluid in cylinders 52, and a lesser area of piston-members exposed to the lubricant in cylinders 58, for producing a differentially greater pressure by piston-members 58 on the lubricant, than the pressure of the fluid in cylinders 52 and the gooseneck. This produces pressure on the lubricant supplied to the packing devices in excess of the pressure of the wash-fluid passing through the gooseneck 26 and tube 38. This exemplifies means operable responsively to the pressure of the wash-fluid flowing through the swivel, for forcing lubricant with a differentially greater pressure than the wash-fluid from cylinders 58 to the parts to be lubricated. Fittings 57ᵃ are secured in the heads 57 of casing 53 for filling the cylinders 58 with lubricant. Duct 62 communicatively connects cylinders 58 for the outflow of lubricant under the pressure exerted by pistons 56, to a needle valve 64 which is screw-threaded into one end of casing 53 and meters the flow of the lubricant through a chamber 66 to a pipe 67 which is connected to deliver lubricant to the upper packing device. Pipe 67 is connected by a union coupling 68 to the collar 40 of the upper packing device which is connected to the gooseneck 26. Coupling 68 communicates with the annular channel 69 between the oil ring 44 and the wall of coupling 40 of the upper packing device. The tube 38 and packing devices are invertible for interchangeable connection to the element 26. Fittings 75 in any desired number, are screw-threaded into openings in each of the collars 40 by means of coupling 68 for convenient connection to pipe 67.

The operation of the lubricating system will be as follows: During the operation of the swivel, wash-fluid is being pumped through the gooseneck, and some of said fluid will enter and fill chambers 52 through duct 60 from gooseneck 26, and exert pressure upon the piston-members 54 having the greater area, which will shift piston-members 56 having lesser area, to exert a greater pressure against the lubricant in cylinders 58 than that in the fluid passing through the swivel. Valve 64 which is adjustable, meters the lubricant passing from chamber 66 to pipe 67 and coupling 68 into the channel 69 in the upper coupling collar 40. From channel 69, the lubricant passes around ring 44 and through radial ports 70, into annular space or channel 72, and then to the sealing rings 49 and 50 in the upper coupling member, and constantly lubricates the contacting surfaces between tube 38 and said sealing rings. From channel 72 in the upper packing device, lubricant will also be forced into the upper ends of axial ports 71 in tube 38. These axial ports 71 will conduct lubricant to the space or channel 72 in the lower packing device, so it will pass around said tube and be fed to the sealing rings 49, 51, in the lower packing device. Piston-members 56 which force lubricant from cylinders 58 to the packing devices, and valve 64, produce a metered, continuous feed of lubricant to the packing devices during the operation of the swivel, to keep the contacting surfaces between packings 49 and 50 continuously lubricated. When the supply of lubricant in cylinders 58 has been exhausted, it may be replenished by forcing lubricant through fittings 57$^a$ into cylinders 58.

During a drilling operation, the wash-fluid delivered into gooseneck 26 will flow through tube 38 into the rotatable stem 10 and to the drill pipe. The packing devices prevent the escape of fluid at the junctures of tube 38 with gooseneck 26 and stem 10. Tube 38, the ends of which contact with the lubricated rings 49 and 50 in the packing device on the non-rotatable gooseneck, and the lubricated rings 49 and 50 in the packing device which rotates with stem 10, will be floating or free to remain stationary with gooseneck 26, or rotate with stem 10, or rotatably slip relatively to both packing devices. This distributes the wear on the contact surfaces between tube 38 and the sealing rings, and tube 38 is free to position itself within the sealing rings to compensate for axial misalignment of the gooseneck 26 and stem 10 while maintaining the fluid seals. When for any purpose it is desired to remove tube 38 for repair or replacement of the packing devices, or the sealing rings, it is only necessary to unscrew collars 40 from gooseneck 26 and from stem 10 and move the packing devices together, and disconnect pipe 67 from the collar 40 of the upper packing device. Tube 38 and the packing devices can then be unitarily removed laterally from the space between gooseneck 26 and stem 10. This may be done while the gooseneck remains secured to bonnet 20, and stem 10 remains journalled in casing 16, and greatly facilitates the removal and replacement of tube 38 and the packing assemblies. When the tube and packing assemblies have been thus removed, the packing assemblies may be readily slipped off the ends of the tube, for repair or replacement of their parts. In replacing the tube and packing devices, the assembled tube 38 and the packing devices may be laterally inserted between gooseneck 26 and stem 10, and the coupling collars 40 may be readily secured in operative position. The packing devices and tube are endwise reversible for interchangeably securing the packing devices to the gooseneck 26 and stem 10.

The invention exemplifies lubricating means for a rotary hydraulic swivel which: continuously forces lubricant to the sealing means between the elements of the swivel which are coupled together by packing devices; utilizes the pressure of the wash-liquid flowing through the swivel for providing the pressure for forcing the lubricant from a reservoir to the sealing devices; meters the lubricant delivered to the sealing devices; can be easily loaded with lubricant through fittings connected to the reservoir; can be advantageously used with a demountable floating and endwise reversible tube interposed between the gooseneck and the rotatable stem; and efficiently lubricates the sealing means for minimizing wear of the parts.

The invention is not to be understood as limited to the details described, since these may be modified within the scope of the appended claim without departing from the spirit or scope of the invention.

Having thus described the invention, what I claim as new and desire to secure by Letters Patent is:

The combination with a hydraulic swivel, comprising non-rotatable and rotatable fluid conducting elements, and a rotatable tube between said elements, of packing devices between the ends of the tube and said elements, respectively, each including a collar provided with means for detachably connecting it to one of the elements, a plurality of sealing rings in each collar, a lubricant distributing ring in each collar between the packing rings and provided with ports, a gland in each collar for seating the distributing ring in the collar, the rotatable tube being provided with ports for delivering lubricant from one packing device to the other, and means for delivering lubricant under pressure through one of the collars to the distributing ring therein.

LESLIE W. STAHL.

REFERENCES CITED

The following references are of record in the file of this patent:

UNITED STATES PATENTS

| Number | Name | Date |
| --- | --- | --- |
| 1,830,440 | Morgan | Nov. 3, 1931 |
| 2,029,631 | Morgan et al. | Feb. 4, 1936 |
| 2,150,529 | Tremolada | Mar. 14, 1939 |
| 2,265,449 | Raynolds | Dec. 9, 1941 |
| 2,459,472 | Tremolada | Jan. 18, 1949 |